L. S. LACHMAN.
UTENSIL AND HANDLE.
APPLICATION FILED OCT. 28, 1905.
945,554.
Patented Jan. 4, 1910.
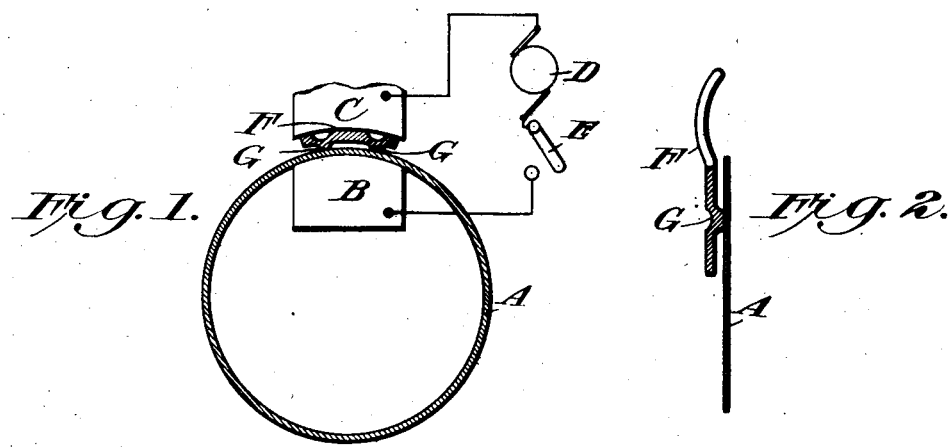
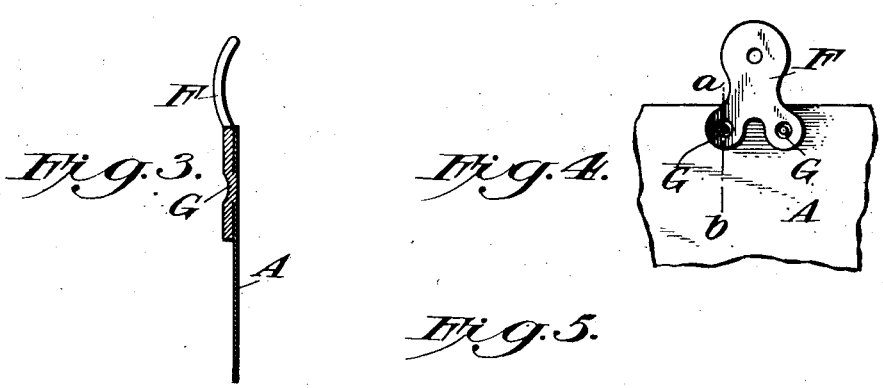
Witnesses:
Inventor:
Laurence S. Lachman
by Dickerson, Brown, Raegener + Motty
Attys

UNITED STATES PATENT OFFICE.

LAURENCE S. LACHMAN, OF NEW YORK, N. Y.

UTENSIL AND HANDLE.

945,554.  Specification of Letters Patent.  Patented Jan. 4, 1910.

Application filed October 28, 1905. Serial No. 284,903.

*To all whom it may concern:*

Be it known that I, LAURENCE S. LACHMAN, a citizen of the United States, and resident of the borough of Manhattan, city, county, and State of New York, have invented certain new and useful Improvements in Utensils and Handles, of which the following is a specification accompanied by drawings.

This invention relates to improvements in all kinds of sheet metal utensils which are provided with handles of all descriptions, or broadly speaking, lugs, projections or ears, by means of which the utensil may be handled or hung or supported in any manner.

Heretofore it has been customary to secure the handles or ears to the sheet metal utensils by means of rivets or interlocking connections, and then in certain classes of metal ware the utensil is covered with enamel or otherwise plated or coated in any desired manner. The rivet heads cannot be concealed and show through the enamel. The handles and ears are also apt to become loose at the riveting and the enamel is consequently cracked, and it is very difficult to obtain a tight joint with rivets, and spaces are left for the accumulation of dirt and acids which corrode the parts.

The objects of this invention are to obviate the disadvantages heretofore present in utensils which have handles riveted thereto, or otherwise attached, and enable the utensil to be enameled or otherwise coated without disfigurement with a smooth uniform coat of enamel having no parts of the base metal projecting or showing through such coat.

Another object of the invention is to enable the handles or ears to be attached securely and tightly in such manner that they will not work loose and crack the enamel.

The present invention comprises utensils having handles ears or like attachments of thicker sheet metal than that forming the body of such utensil secured to such body by isolated, autogenous spot welds between abutting surfaces of such handle or ear or other attachment and such body, the weld or welds being between comparatively small areas of such abutting surfaces and the metal of the two parts at the point of the spot weld being made integral and united without the formation of any projection or line of union occurring on the sides of the parts opposite such abutting surfaces.

I will now proceed to describe my invention with reference to the accompanying drawing in which certain forms of utensils embodying the described invention are illustrated.

In this showing: Figure 1 is a vertical sectional view of a utensil and an ear about to be secured thereto by means of an electrical weld formed in dies; Fig. 2 is a vertical sectional view in enlarged detail, showing one of the ears in readiness to be welded to the utensil; Fig. 3 is a like view showing the ear after it has been welded; Fig. 4 is an enlarged detail face view of one of the ears after it has been attached to the utensil; Fig. 5 is a view in cross section similar to that shown in Fig. 3, showing an enamel coating over the surface of the welded joint.

This invention applies to all kinds of utensils, whether pots, pans and dishes, or shovels, rakes and other agricultural implements. Any implement or utensil to which the invention is applicable may be provided with handles or attachments in accordance therewith. Ordinarily the handle, attachment or ear to be secured to the utensil is of substantially thicker material than the sheet metal of the utensil itself. This general statement applies to almost all cooking utensils and household articles, but is perhaps not true of all agricultural implements. The invention, however, more particularly relates to those implements and utensils in which the sheet metal of the article itself is comparatively thin, while the ear or handle is comparatively thick, for instance, three or four gages thicker than the sheet metal of the utensil.

In securing the handles to the implements or utensils I first produce isolated projections or points on the handle, which points are substantially separated and independent one from the other. The handle is then placed upon the thinner metal of the utensil with the points in contact with the surface thereof, and an electric current is passed through the handle, the points and the sheet metal of the implement, thereby bringing the points and the metal in contact therewith to a welding condition, and simultaneously pressure is applied to force the handle or ear against the utensil, thereby forming one or more complete autogenous spot welds, according to the number of points with which the thicker object was provided.

I have discovered that the method described is more particularly applicable to instances in which the points or projections are formed upon the thicker metal, because if two very thick pieces of metal are attempted to be welded in the manner described, the resistance afforded by the thick metal having no points is not sufficient to bring it to a welding heat, the concentrated heat and current of the point diffusing laterally in the thick flat piece of metal to which the point is opposed, and therefore a superficial weld only is obtained. When the piece having the points is very thick and the utensil is thin, the resistance afforded by the thin sheet metal is substantially high, and the metal upon which the contacts bear is therefore locally heated to a high temperature suitable for welding and the separated and independent points or projections are brought into a welding condition and are incorporated with the thin sheet metal, forming a secure integral and autogenous spot weld. The metal of the points becomes a homogeneous part of the whole utensil and cannot be separated therefrom without cutting out the weld. If the handle is attempted to be removed from the utensil a piece of the sheet metal of the utensil must be taken with it.

The preferable method of welding two pieces of substantially thick metal together is to provide points or projections on each and place said points in contact one with the other, thereby affording a high resistance, which heats the points to a welding condition and forms a weld, but this method is not the preferable one to use in the instance described and shown in the drawings, because the resistance formed between the points is so high that the thin sheet metal such as shown in the drawings as forming the utensil would be burned and melted to such an extent that a firm weld would not be obtained.

In Fig. 1 a section is shown through a pan A placed between the dies B and C which are connected in circuit with the generator D, having a switch E for controlling the current. The thick ear F is placed against the thinner side of the utensil in the position desired with the points or projections G in contact with the flat or rounded surface of the pan; the current is turned on and simultaneously therewith the upper die C is moved toward the lower die B, thereby compressing the material and forcing the ear against the pan. In this way the points G are incorporated into the metal of the utensil. The amount of current is of course adjusted so that it will suffice to heat the projection and the thin metal against which it contacts to a good welding temperature. After the projection disappears by coalescence with such thin metal, the two broad surfaces of the two parts come into mutual contact affording a conductor which such an amount of current will not heat to a welding temperature or to any dangerous degree.

In Fig. 2 an enlarged detail view is shown of the ear placed against the side of the pan, and in Fig. 3 a section is taken through the weld showing how completely the metals are incorporated one with the other. At the location of the spot weld the metal of the two parts becomes integral.

In Fig. 5 is shown a cross sectional view similar to that shown in Fig. 3 with a coating of enamel on the exterior of the welded joint.

The dies B and C are shown diagrammatically in Fig. 1, and it is to be understood that they may be constructed in any suitable manner to weld handles or attachments of all kinds to utensils.

The active contact area of the points G in each case is substantially equal to the area of the complete weld, and each point is entirely separate and independent from every other one so that in the completed articles the handles or ears are electrically united to the utensil by a plurality of small individual autogenous weld-unions, or spot welds.

I do not herein claim the process of electric welding disclosed, for this forms the subject matter of my co-pending application, Serial No. 284,905, filed October 28, 1905, for a process of electric welding, (Patent No. 846,480, March 12, 1907.)

My present invention consists of a new article of manufacture, which comprises a composite sheet metal structure having component parts consisting of the thin sheet metal wall of a utensil and an attachment in the form of an ear or handle, said ear or handle being of relatively and substantially thicker metal than the utensil. The component parts are united on their plane surfaces at a point of electrically welded union formed by a point of projection integral with the surface of the thicker ear or handle laid against the wall of the thinner component part and welded thereto, whereby only the point or projection is incorporated with the metal of the thin utensil wall. Furthermore the component parts are fastened together face to face over their plane surfaces by a multiplicity of distinct and substantially widely spaced electric welds or unions formed at a multiplicity of contact spots between the surfaces of the component parts by projections integral with the thicker ear or handle, said projections being welded to the thinner utensil wall.

Obviously some features of this invention may be used without others and the invention may be embodied in widely varying forms.

Therefore, without limiting the invention to the devices shown and described, and without enumerating equivalents, I claim and desire to obtain by Letters Patent the following:

As a new article of manufacture, a utensil comprising a body of relatively thin sheet metal and a metal attachment of relatively thick metal secured thereto by an isolated spot weld between abutting surfaces, said spot weld being of comparatively small area and the metal of the two parts at the location of such weld being integral and the metal of the sides of such parts opposite such abutting surfaces being all within the general plane of such opposite sides and presenting a continuous integral surface on each of such opposite sides, and a glaze coating covering a surface of said utensil and the portion of such attachment in immediate union with such utensil.

In testimony whereof I have signed this specification in the presence of two subscribing witnesses.

LAURENCE S. LACHMAN.

Witnesses:
A. L. O'BRIEN,
O. A. FOSTER.